Patented Mar. 11, 1924.

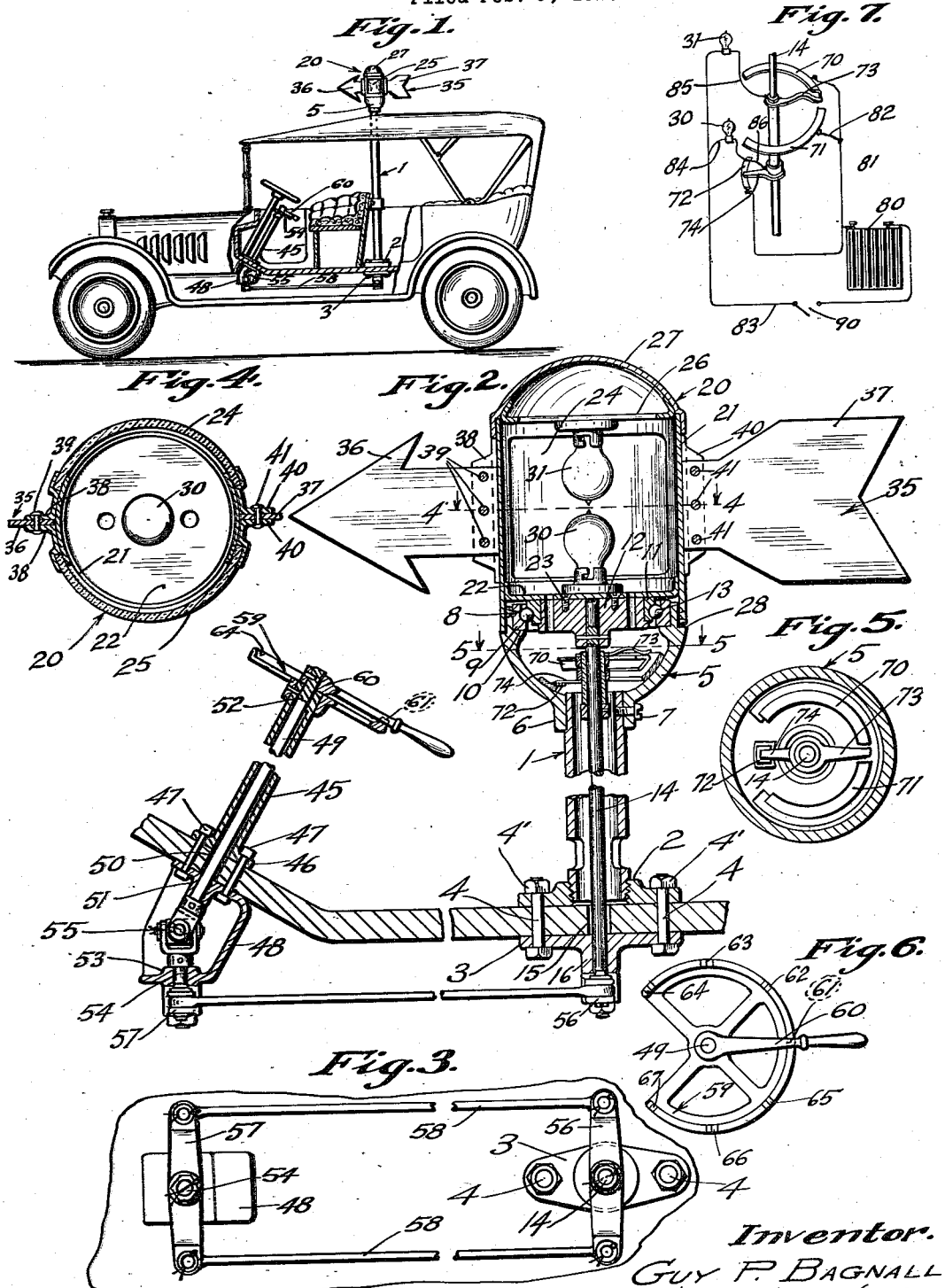

1,486,410

UNITED STATES PATENT OFFICE.

GUY P. BAGNALL, OF LOS ANGELES, CALIFORNIA.

DIRECTION INDICATOR FOR MOTOR-DRIVEN VEHICLES.

Application filed February 5, 1920. Serial No. 356,435.

*To all whom it may concern:*

Be it known that I, GUY P. BAGNALL, a subject of the King of Great Britain, residing at Los Angeles, in the county of Los Angeles and State of California, have invented new and useful Improvements in Direction Indicators for Motor-Driven Vehicles, of which the following is a specification.

My invention is an improved direction indicator for motor vehicles.

Referring to the annexed drawing which forms a part of this specification:

Figure 1 is a side elevation of an automobile partly broken way embodying my invention.

Fig. 2 is a vertical longitudinal section of my invention.

Fig. 3 is a bottom plan of my invention.

Fig. 4 is a cross section of my invention taken on line 4—4 of Fig. 2.

Fig. 5 is a cross section of my invention taken on line 5—5 of Fig. 2.

Fig. 6 is a plan view of the operating mechanism.

Fig. 7 is a diagrammatic view of the electric circuit controlling my direction indicator.

In the drawing, 1 indicates a tubular standard, the lower end of which is screwed into a base plate 2 which is secured on the floor of an automobile at the rear of the front seat thereof. On the under side of the floor of the automobile directly below the base 2 rests a plate 3. Bolts 4 extend through the floor and through the plates 2 and 3 and nuts 4' screw on the upper end of said bolts against the plate 2, holding said plates in position on said floor.

A bowl-shaped support 5 is mounted on the upper end of the standard 1, said support being provided with an opening in the bottom surrounded by a depending flange 6 which fits over the upper reduced end of said standard and a screw 7 extends through said flange into the standard, holding the support securely on the standard. In the top of said support is a ball bearing 8 comprising an internal cone 9 supported in an annular recess 10 in the top of the support, an external cone 11 mounted on a hub 12, and balls 13 interposed between said cones. A vertical shaft 14 extends through the standard 1, support 5 and an opening 15 in the floor of the automobile and is journaled at its lower end in a bearing 16 on the plate 3 and is pinned at its upper end in the hub 12 in axial alignment therewith. The lantern 20 is mounted upon the hub 12 which includes a frame 21, a bottom wall 22 resting upon said hub and secured thereto by screws 23, two diametrically opposed sections of glass 24 and 25 and an upper transverse wall 26, the top wall 27 being dome shaped above the wall 26. The bottom wall 22 rests above the lower edge of the frame 21 which depends in an annular external recess 28 in the upper edge of the support 5. In the lantern are mounted a white electric light 30 and a green electric light 31, the light 30 being mounted upon the bottom wall 22 and the light 31 being mounted on the inside of the upper wall 26. An indicating arrow 35 is mounted diametrically on the lantern at 90° with relation to the glass sections 24 and 25, said arrow being formed in two sections, a forward section 36 and a rear section 37, the section 36 being secured between two external flanges 38 on the lantern frame 21 by rivets 39 and the section 37 being secured on the lantern between two external flanges 40 and the lantern frame 21 by rivets 41.

Within convenient reach from the driver's seat, a tubular standard 45 is mounted in the front of the automobile, preferably adjacent the rear side of the automobile steering post, said standard being formed with a base flange 46 resting upon the forward angular floor of the automobile and secured thereto by bolts 47 which extend through the floor of the automobile and also secure a frame 48 to the under side of the floor directly below the standard. A shaft 49 extends through the standard 45, an opening 50 in the automobile floor, and through the upper part of the frame 48, and is journaled at its lower end in a bearing 51 in the frame 48 and at its upper end in a bearing 52 in the top of the standard 45. In the lower part of the frame 48 is a bearing 53 in which is journaled a vertical stud shaft 54 which is connected to the lower end of the shaft 49 by a universal joint 55. On the lower end of the shaft 14 is secured a lever 56 and on the lower end of the shaft 54 is secured a lever 57. The corresponding ends of said levers are connected by connecting rods 58. On the upper end of the standard 45 is secured a segment 59 and on the upper end of the shaft 49 above said segment is secured an operating lever 60. On the upper face of the segment 59 are a plurality of lugs 61, 62, 63, 64, 65, 66 and 67, which lugs are arranged 45° apart.

The lever 60 normally engages lug 61 whereby it is held against rotation and the lantern 20 locked in position with the arrow 35 pointing forwardly, and the lenses 24 an 25 at the right and left thereof, as shown in Figs. 1 and 2. In the support 5 are mounted two segmental electric contacts 70 and 71 and a segmental contact 72, the contacts 70 and 71 being arranged end to end with their adjacent ends spaced a short distance apart. A contact arm 73 is secured on the shaft 14 which wipes the contacts 70 and 71 but normally rests in position in the space between said contacts, as shown in Figs. 5 and 7. A contact 74 is secured on the shaft 14 which normally wipes the segment 72. Electricity for the lights 30 and 31 is supplied by a battery 80 or other source of electrical energy mounted on the automobile. To one pole of the battery 80 is secured a lead 81 which connects to the contacts 70 and 72 and through a lead 82 connects to the contact 71. A lead 83 is connected to the other pole of the battery 80 and to one terminal of lamp 31 and through a lead 84 to one terminal of lamp 30. The other terminal of lamp 31 is connected to the contact arm 73 by a lead 85. The other terminal of lamp 30 is connected by lead 86 to the contact arm 74. A controlling switch 90 is interposed in the lead 83.

The standard 1 extends through the top of the automobile so that the lantern 20 and arrow 35 are located above the top of the automobile where they may be very readily seen. The operation of my invention is as follows:

With the lever 60 in engagement with the lug 61 the lantern 20 is in position with the arrow 35 pointing forwardly and the glass sections 24 and 25 respectively at the right and left side of the lantern while the contact 74 engages contact 72 and lights the white light 30 and the contact 73 rests in the space between the contacts 70 and 71 with the circuit of lamp 31 broken. The white light 30 is for the purpose of exposing the indicator in its normal position to show the presence of an indicator on the top of the automobile, the glass sections 24 and 25 being of such width that the light may be seen from the front and rear of the automobile.

If the automobile is about to turn to the right or left on to a road which extends at an angle of about 45° to the direction of the automobile, the driver swings the lever 60 into engagement with the lug 62 or 65, which, in turn, swings the lantern 20 and the arrow 35 forty-five degrees to the right or left, in which position the contact 74 disengages the contact 72 and puts out the white light 30 while the contact 73 engages the contact 70 or 71 and puts on the signalling green light 31, thus indicating that the automobile is to turn on a road at substantially 45° to the right or the left.

If the automobile is to turn on a road substantially 90° to the right or to the left, the driver swings the lever 60 into engagement with the lug 63 or 66 which turns the lantern 20 and the arrow 35 to 45° to the right or left, puts out the light 30 and puts on the light 31, thus indicating that the automobile is to turn 90° to the right or to the left.

To indicate other actions of the automobile such as, stopping or backing or slowing down, the lever 60 may be swung into engagement with the lugs 64 or 67 to swing the lantern 20 and the arrow 35 at a greater angle than 90° to the right or left.

Various changes may be made without departing from the spirit of my invention, as claimed.

I claim:

The combination with an automobile having a floor and a seat, of a tubular standard secured upright to said floor near said seat and surmounted by a bowl carrying bearings, a shaft rotatable within said tubular standard, signaling means secured to said shaft and comprising a lantern provided with a plurality of electric lights and mounted upon said bearings, there being an indicating means mounted upon said lantern, manually operable means within reach from said seat, means connecting said manually operable means and said shaft to rotate the latter and the indicating means therewith, and means whereby the operation of said manually operable means may cause current to flow alternately through one or another of said lights.

In testimony whereof I have signed my name to this specifications.

GUY P. BAGNALL.